(12) United States Patent
Shindo et al.

(10) Patent No.: US 9,942,727 B2
(45) Date of Patent: *Apr. 10, 2018

(54) MOBILE COMMUNICATION SYSTEM, CORE NETWORK NODE, CONTROL STATION, BASE STATION, COMMUNICATION METHOD AND PROGRAM

(71) Applicant: NEC CORPORATION, Tokyo (JP)

(72) Inventors: Masato Shindo, Minato-ku (JP); Sadafuku Hayashi, Minato-ku (JP)

(73) Assignee: NEC CORPORATION, Tokyo (JP)

( * ) Notice: Subject to any disclaimer, the term of this patent is extended or adjusted under 35 U.S.C. 154(b) by 67 days.

This patent is subject to a terminal disclaimer.

(21) Appl. No.: 14/795,200

(22) Filed: Jul. 9, 2015

(65) Prior Publication Data

US 2015/0312728 A1  Oct. 29, 2015

Related U.S. Application Data

(63) Continuation of application No. 13/122,476, filed as application No. PCT/JP2009/065717 on Sep. 9, 2009, now Pat. No. 9,113,440.

(30) Foreign Application Priority Data

Oct. 31, 2008 (JP) .................................. 2008-281441

(51) Int. Cl.
*H04W 4/06* (2009.01)
*H04W 72/00* (2009.01)
(Continued)

(52) U.S. Cl.
CPC .......... *H04W 4/06* (2013.01); *H04W 72/005* (2013.01); *H04L 12/189* (2013.01); *H04W 88/12* (2013.01)

(58) Field of Classification Search
None
See application file for complete search history.

(56) References Cited

U.S. PATENT DOCUMENTS 7,171,212 B2  1/2007  Kim et al.
7,539,493 B2  5/2009  Kwak et al.
(Continued)

FOREIGN PATENT DOCUMENTS

CN  101015142 A  8/2007
CN  101258697 A  9/2008
(Continued)

OTHER PUBLICATIONS

Communication dated Sep. 8, 2015 from the Japanese Patent Office in counterpart application No. 2014-234275.
(Continued)

*Primary Examiner* — Gary Mui
(74) *Attorney, Agent, or Firm* — Sughrue Mion, PLLC

(57) ABSTRACT

A mobile communication system of the present invention is a mobile communication system including a mobile station, base stations each of which forms a cell and transmits MBMS data to the mobile station existing in the cell, control stations each of which controls a base station connected thereto, and further including a core network node that instructs each of the control stations connected thereto with respect to the frequency and timing for transmitting MBMS data in the cell, wherein each of the control stations establishes time synchronization with another control station and instructs the connected base station to set the cell to the frequency designated by the core network node and transmits, to the connected base station, the MBMS data in accordance with the transmission timing designated by the core network node and the mobile station then receives the MBMS data.

10 Claims, 23 Drawing Sheets

(51) Int. Cl.
H04L 12/18 (2006.01)
H04W 88/12 (2009.01)

(56) References Cited

U.S. PATENT DOCUMENTS

| | | | |
|---|---|---|---|
| 7,860,107 | B2 | 12/2010 | Legg |
| 7,894,338 | B2 | 2/2011 | Ljung et al. |
| 8,050,221 | B2 | 11/2011 | Jeong et al. |
| 8,135,043 | B2 | 3/2012 | Ogura |
| 8,542,622 | B2 | 9/2013 | Wu et al. |
| 2004/0014482 | A1 | 1/2004 | Kwak et al. |
| 2004/0103435 | A1 | 5/2004 | Yi et al. |
| 2006/0252430 | A1 | 11/2006 | Barreto et al. |
| 2007/0213081 | A1 | 9/2007 | Zhang |
| 2008/0205322 | A1 | 8/2008 | Cai et al. |
| 2008/0293399 | A1 | 11/2008 | Xu et al. |
| 2009/0010255 | A1 | 1/2009 | Kim et al. |
| 2009/0116433 | A1 | 5/2009 | Motegi et al. |
| 2009/0303910 | A1 | 12/2009 | Sun et al. |
| 2010/0027541 | A1 | 2/2010 | Eriksson et al. |
| 2010/0077088 | A1 | 3/2010 | Hyun et al. |
| 2010/0110958 | A1 | 5/2010 | Racz et al. |
| 2010/0232340 | A1 | 9/2010 | Godor et al. |
| 2010/0254352 | A1* | 10/2010 | Wang ............... H04W 72/005 370/332 |
| 2011/0032858 | A1 | 2/2011 | Lohmar et al. |
| 2011/0085489 | A1 | 4/2011 | Rydnell et al. |

FOREIGN PATENT DOCUMENTS

| | | |
|---|---|---|
| EP | 1924012 A1 | 5/2008 |
| JP | 2004-135260 A | 4/2004 |
| JP | 2004221760 A | 8/2004 |
| JP | 2005524333 A | 8/2005 |
| JP | 2005348154 A | 12/2005 |
| JP | 2007-74577 A | 3/2007 |
| JP | 2007110766 A | 4/2007 |
| JP | 2008182385 A | 8/2008 |
| JP | 2008245060 A | 10/2008 |
| WO | 2008042225 A2 | 4/2008 |
| WO | 2008/061437 A1 | 5/2008 |
| WO | 2008053686 A1 | 5/2008 |

OTHER PUBLICATIONS

Nokia Siemens Networks, Nokia, E-MBMS Architecture and Session management, R3-071566, 3GPP, Aug. 2007 (7 pages).

Communication dated Sep. 30, 2014, from the Japanese Patent Office in counterpart Japanese Application No. 2014029481.

Communication dated Aug. 14, 2014, from the State Intellectual Property Office of the People's Republic of China in counterpart Chinese Application No. 200980143468.3

"UTRAN Iu interface RANAP signaling", 3GPP TSG RAN 25.413, V7.9.0, Jun. 2008, 7 pages total.

Office Action, dated May 22, 2013, issued by the State Intellectual Property Office of the People's Republic of China in counterpart Chinese Application No. 200980143468.3.

Office Action, dated Mar. 19, 2013, issued by the Japanese Patent Office in counterpart Japanese Patent Application No. 2010-535726.

Extended European Search Report, dated May 13, 2013, issued by the European Patent Office in counterpart European Patent Application No. 13152689.9.

Siemens, "Discussion on E-MBMS MCE Functionalities," 3GPP TSG RAN WG3 Meeting #54, Riga, Latvia, Nov. 6-10, 2006, pp. 1-3.

3$^{rd}$ Generation Partnership Project; Technical Specification Group Core Network and Terminals; Interworking between Public Land Mobile Network (PLMN) supporting packet based services and Packet Data Networks (PDN) (Release 8), 3GPP TS 29.061 V8.0.0, Sep. 2008.

3$^{rd}$ Generation Partnership Project; Technical Specification Group Radio Access Network; Improvement of the Multimedia Broadcast Multicast Service (MBMS) in UTRAN (Release 7), 3GPP TR 25.905 V7.2.0, Dec. 2007.

3$^{rd}$ Generation Partnership Project; Technical Specification Group Services and System Aspects; Multimedia Broadcast/Multicast Service (MBMS); Architecture and functional description (Release 7), 3GPP TS 23.246 V7.4.0. 200-09.

3$^{rd}$ Generation Partnership Project; Technical Specification Group Core Network and Terminals; Mobile radio interface Layer 3 specification; Core network protocol; Stage3 (Release 8), 3GPP TS 24.008 V8.3.0, Sep. 2008.

3$^{rd}$ Generation Partnership Project; Technical Specification Group Radio Access Network; Synchronisation in UTRAN Stage 2 (Release 7), 3GPP TS 25.402 V7.6.0, Sep. 2008.

3$^{rd}$ Generation Partnership Project; Technical Specification Group Radio Access Network; UTRAN Iu interface RANAP signalling (Release 8), 3GPP TS 25.413 V8.0.1, Sep. 2008.

3$^{rd}$ Generation Partnership Project; Technical Specification Group Core Network and Terminals; General Packet Radio Services (GPRS); GPRS Tunnelling Protocol (GTP) across the Gn and Gp interface (Release 8), 3GPP Ts 29.060 V8.5.0, Sep. 2008.

Communication, dated Nov. 13, 2012, from the Korean Intellectual Property Office in counterpart application No. 10-2012-7021565.

* cited by examiner

Figure 2
RELATED ART (a) When MBSFN is used

| Receiver | Receiver capable of equalizing 3 RLs | Receiver capable of equalizing 7 RLs |
|---|---|---|
| Type-2 | 1.536 Mbps | 2.624 Mbps |
|  | 0.307 b/s/Hz | 0.525 b/s/Hz |
| Type-3 | 3.008 Mbps | 5.376 Mbps |
|  | 0.602 b/s/Hz | 1.075 b/s/Hz |

(b) When MBSFN is not used

| Receiver | Receiver capable of soft combining 3 RLs |
|---|---|
| Rake | 1.152 Mbps |
|  | 0.2304 b/s/Hz |
| Type-1 | 2.240 Mbps |
|  | 0.448 b/s/Hz |
| Type-2 | 1.216 Mbps |
|  | 0.2432 b/s/Hz |
| Type-3 | 2.368 Mbps |
|  | 0.4736 b/s/Hz |

Figure 7

```
<RAR> ::= < Diameter Header: 258, REQ, PXY >
            < Session-Id >
            { Origin-Host }
            { Origin-Realm }
            { Destination-Realm }
            { Destination-Host }
            { Auth-Application-Id }
            { Re-Auth-Request-Type }
            [ Called-Station-Id ]
            [ Framed-IP-Address ]
            [ Framed-IPv6-Prefix ]
            [ Framed-Interface-Id ]
                             [ MBMS-StartStop-Indication ]
                             [ MBMS-Service-Area ]
            [ MBMS-Required-QoS ]
                             [ MBMS-Session-Duration ]
                             [ MBMS-Service-Type ]
            [ MBMS-Counting-Information ]
                             [ MBMS-Session-Identity ]
            [ MBMS-Session-Repetition-number ]
                             [ TMGI ]
          * [ 3GPP-SGSN-Address ]          ; broadcast case only
          * [ 3GPP-SGSN-IPv6-Address ]     ; broadcast case only
            [ MBMS-2G-3G-Indicator ]
            [ MBMS-Time-To-Data-Transfer ]
            [ MBMS-User-Data-Mode-Indication ]
            [ MBMS-BMSC-SSM-IP-Address ]
            [ MBMS-BMSC-SSM-IPv6-Address ]
12 ~~~~~ [ MBSFN-Frequency ]
13 ~~~~~ [ MBSFN-Scrambling-Code ]
14 ~~~~~ [ MBSFN-Channelisation-Code ]
15 ~~~~~ [ MBSFN-Slot-Format ]
16 ~~~~~ [ MBSFN-Tx-Timing ]
            [ Origin-State-Id ]
          * [ Proxy-Info ]
          * [ Route-Record]
```

Figure 8

| Information element |
| --- |
| Recovery |
| Tunnel Endpoint Identifier Control Plane |
| End User Address |
| Access Point Name |
| GGSN Address for Control Plane |
| Alternative GGSN Address for Control Plane |
| Quality of Service Profile |
| Common Flags |
| Temporary Mobile Group Identity (TMGI) |
| MBMS Session Duration |
| MBMS Service Area |
| MBMS Session Identifier |
| MBMS 2G/3G Indicator |
| MBMS Session Repetition Number |
| MBMS Time To Data Transfer |
| MBSFN-Frequency |
| MBSFN-Scrambling-Code |
| MBSFN-Channelisation-Code |
| MBSFN-Slot-Format |
| MBSFN-Tx-Timing |
| Private Extension |

Figure 9

| IE/Group Name |
| --- |
| Message Type |
| TMGI |
| MBMS Session Identity |
| MBMS Bearer Service Type |
| Iu Signalling Connection Identifier |
| RAB parameters |
| PDP Type Information |
| MBMS Session Duration |
| MBMS Service Area |
| Frequency Layer Convergence Flag |
| RA List of Idle Mode UEs |
| Global CN-ID IE |
| MBMS Session Repetition Number |
| Time to MBMS Data Transfer |
| MBMS Counting Information |
| MBSFN Information |
|     MBSFN-Frequency |
|     MBSFN-Scrambling-Code |
|     MBSFN-Channelisation-Code |
|     MBSFN-Slot-Format |
|     MBSFN-Tx-Timing |

Figure 11

```
<RAR> ::= < Diameter Header: 258, REQ, PXY >
         < Session-Id >
         { Origin-Host }
         { Origin-Realm }
         { Destination-Realm }
         { Destination-Host }
         { Auth-Application-Id }
         { Re-Auth-Request-Type }
         [ Called-Station-Id ]
         [ Framed-IP-Address ]
         [ Framed-IPv6-Prefix ]
         [ Framed-Interface-Id ]
                                 [ MBMS-StartStop-Indication ]
                                 [ MBMS-Service-Area ]
         [ MBMS-Required-QoS ]
                                 [ MBMS-Session-Duration ]
                                 [ MBMS-Service-Type ]
         [ MBMS-Counting-Information ]
                                 [ MBMS-Session-Identity ]
         [ MBMS-Session-Repetition-number ]
                                 [ TMGI ]
       * [ 3GPP-SGSN-Address ]          ; broadcast case only
       * [ 3GPP-SGSN-IPv6-Address ]     ; broadcast case only
         [ MBMS-2G-3G-Indicator ]
         [ MBMS-Time-To-Data-Transfer ]
         [ MBMS-User-Data-Mode-Indication ]
         [ MBMS-BMSC-SSM-IP-Address ]
         [ MBMS-BMSC-SSM-IPv6-Address ]
16 ~~~~  [ MBSFN-Tx-Timing ]
17 ~~~~  [ MBSFN-Indicator ]
         [ Origin-State-Id ]
       * [ Proxy-Info ]
       * [ Route-Record]
```

Figure 12

| Information element |
|---|
| Recovery |
| Tunnel Endpoint Identifier Control Plane |
| End User Address |
| Access Point Name |
| GGSN Address for Control Plane |
| Alternative GGSN Address for Control Plane |
| Quality of Service Profile |
| Common Flags |
| Temporary Mobile Group Identity (TMGI) |
| MBMS Session Duration |
| MBMS Service Area |
| MBMS Session Identifier |
| MBMS 2G/3G Indicator |
| MBMS Session Repetition Number |
| MBMS Time To Data Transfer |
| MBSFN-Indicator |
| MBSFN-Tx-Timing |
| Private Extension |

Figure 13

| IE/Group Name |
| --- |
| Message Type |
| TMGI |
| MBMS Session Identity |
| MBMS Bearer Service Type |
| Iu Signalling Connection Identifier |
| RAB parameters |
| PDP Type Information |
| MBMS Session Duration |
| MBMS Service Area |
| Frequency Layer Convergence Flag |
| RA List of Idle Mode UEs |
| Global CN-ID IE |
| MBMS Session Repetition Number |
| Time to MBMS Data Transfer |
| MBMS Counting Information |
| MBSFN Information |
|     MBSFN-Indicator |
|     MBSFN-Tx-Timing |

Figure 14

| MBSFN Indicator | Frequency | Scrambling Code | Channelisation Code | Slot Format |
|---|---|---|---|---|
| 0 | N/A | N/A | N/A | N/A |
| 1 | f1 | sc1 | cc1 | sf1 |
| 2 | f2 | sc2 | cc2 | sf2 |
| ... | ... | ... | ... | ... |
| 127 | f15 | sc15 | cc15 | sf15 |

Figure 15

```
<RAR> ::= < Diameter Header: 258, REQ, PXY >
          < Session-Id >
          { Origin-Host }
          { Origin-Realm }
          { Destination-Realm }
          { Destination-Host }
          { Auth-Application-Id }
          { Re-Auth-Request-Type }
          [ Called-Station-Id ]
          [ Framed-IP-Address ]
          [ Framed-IPv6-Prefix ]
          [ Framed-Interface-Id ]
                              [ MBMS-StartStop-Indication ]
                              [ MBMS-Service-Area ]
          [ MBMS-Required-QoS ]
                              [ MBMS-Session-Duration ]
                              [ MBMS-Service-Type ]
          [ MBMS-Counting-Information ]
                              [ MBMS-Session-Identity ]
          [ MBMS-Session-Repetition-number ]
18 ─────────────────────────── [ TMGI ]
        * [ 3GPP-SGSN-Address ]           ; broadcast case only
        * [ 3GPP-SGSN-IPv6-Address ]      ; broadcast case only
          [ MBMS-2G-3G-Indicator ]
          [ MBMS-Time-To-Data-Transfer ]
          [ MBMS-User-Data-Mode-Indication ].
          [ MBMS-BMSC-SSM-IP-Address ]
          [ MBMS-BMSC-SSM-IPv6-Address ]
          [ Origin-State-Id ]
        * [ Proxy-Info ]
        * [ Route-Record]
```

Figure 16

| 8 | 7 | 6 | 5 | 4 | 3 | 2 | 1 | |
|---|---|---|---|---|---|---|---|---|
| Temporary Mobile Group Identity IEI | | | | | | | | Octet 1 |
| Length of Temporary Mobile Group Identity contents | | | | | | | | Octet 2 |
| MBMS Service ID | | | | | | | | Octet 3 |
| | | | | | | | | Octet 4 |
| | | | | | | | | Octet 5 |
| MCC digit 2 | | | | MCC digit 1 | | | | Octet 6* |
| MCC digit 3 | | | | MCC digit 3 | | | | Octet 7* |
| MCC digit 2 | | | | MCC digit 1 | | | | Octet 8* |

| 8 | 7 | 6 | 5 | 4 | 3 | 2 | 1 | |
|---|---|---|---|---|---|---|---|---|
| 24 | 23 | 22 | 21 | 20 | 19 | 18 | 17 | Octet 3 |
| 16 | 15 | 14 | 13 | 12 | 11 | 10 | 9 | Octet 4 |
| 8 | 7 | 6 | 5 | 4 | 3 | 2 | 1 | Octet 5 |

Figure 18

| MBSFN | Frequency | Scrambling Code | Channelisation Code | Slot Format | Tx |
|---|---|---|---|---|---|
| 0 | N/A | N/A | N/A | N/A | N/A |
| 1 | f1 | sc1 | cc1 | sf1 | TT1 |
| 2 | f2 | sc2 | cc2 | sf2 | TT2 |
| ... | ... | ... | ... | ... | ... |
| 127 | f15 | sc15 | cc15 | sf15 | TT10 |

MOBILE COMMUNICATION SYSTEM, CORE NETWORK NODE, CONTROL STATION, BASE STATION, COMMUNICATION METHOD AND PROGRAM

This application is a continuation of U.S. application Ser. No. 13/122,476, filed Apr. 4, 2011, which is a National Stage of International Application No. PCT/JP2009/065717, filed Sep. 9, 2009, claiming priority based on JP Application No. 2008-281441, filed Oct. 31, 2008, the contents of all of which are incorporated herein by reference in their entirety.

TECHNICAL FIELD

The present invention relates to a mobile communication system, a core network node, a control station, a base station, a communication method and a program.

BACKGROUND ART

3GPP (3rd Generation Partnership Projects) defines a service called "MBMS" (Multimedia Broadcast Multicast Service) (Non Patent Literature 1~7).

MBMS is a service that simultaneously transmits, by broadcasting or multicasting, multimedia data (hereinafter referred to as "MBMS data") such as video and music to a plurality of UEs (User Equipment: mobile station).

Furthermore, 3GPP defines a scheme called "MBSFN (Multicast Broadcast Single Frequency Network)" as the scheme for providing MBMS.

MBSFN is a scheme for transmitting the same MBMS data to UEs in a plurality of cells formed by a plurality of Nodes B (base stations) using the same frequency and at the same timing.

Thus, when viewed from UEs, a plurality of cells can be regarded as one large communication area. This communication area is called "MBSFN cluster" and the UEs can receive MBMS data with a large gain under the control of the MBSFN cluster.

The plurality of cells that form the MBSFN cluster use not only the same frequency but also the same scrambling code, channelisation code and slot format or the like. In the present specification, the frequency, scrambling code, channelisation code and slot format are generically called "radio resources." To be more specific, these radio resources are used for S-CCPCH (Secondary Common Control Physical Channel) which is a common physical channel used to wirelessly transmit MBMS data from a Node B to a UE in each cell.

FIG. 1 illustrates an example of configuration of a mobile communication system of W-CDMA (Wideband-Code Division Multiple Access) that provides MBMS using an MBSFN (Non Patent Literature 1).

As shown in FIG. 1, the related mobile communication system includes BM-SC (Broadcast Multicast-Service Center) 100, GGSN (Gateway GPRS Support Node, GPRS=General Packet Radio Service) 200, SGSN (Serving GPRS Support Node) 300, RNC (Radio Network Controller: control station) 400, Node B (NB) 500 and UE 800.

FIG. 1 shows two RNCs 400-1 and 400-2 as RNC 400.

Furthermore, though not shown in the figure, BM-SC 100, GGSN 200 and SGSN 300 are arranged in a CN (Core Network) and RNC 400 and Node B 500 are arranged in RAN (Radio Access Network) 450 which will be described later. RAN 450 generally has a configuration in which a plurality of Nodes B 500 are connected to one RNC 400.

BM-SC 100 is a node provided with a function of authenticating a user of UE 800 to which MBMS data is transmitted, a function of managing MBMS data and a function of scheduling distribution of MBMS data or the like. Details of these operations are defined in 3GPP and are commonly known, and therefore descriptions thereof will be omitted.

GGSN 200 is a gateway node provided with a function of transferring an IP (Internet Protocol) packet (message and MBMS data integrated into an IP packet) sent from BM-SC 100 to SGSN 300 and a function of transferring the IP packet sent from SGSN 300 to BM-SC 100 or the like. Since details of these operations are defined in 3GPP and are commonly known, descriptions thereof will be omitted.

SGSN 300 is a node provided with a function of routing/transferring an IP packet, a function of performing mobility management and session management necessary for mobile communication or the like. Since details of these operations are defined in 3GPP and are commonly known, descriptions thereof will be omitted.

RNCs 400-1 and 400-2 are nodes provided with a function of controlling RAN 450. For example, RNCs 400-1 and 400-2 determine radio resources of S-CCPCH in cells 600 under their control, instruct Node B 500 to set the S-CCPCH, determine transmission timing for transmitting MBMS data in cell 600 under their control and transmit MBMS data to each Node B 500 in synchronization with the transmission timing. Since details of these operations are defined in 3GPP and are commonly known, descriptions thereof will be omitted. Assume that "under control" in the present specification refers to subordinate nodes connected to the own node, cells formed by the subordinate nodes, MBSFN clusters or the like.

Thus, RNCs 400-1 and 400-2 independently determine radio resources and transmission timing in cells 600 under their control.

Thus, MBSFN cluster 700-1 under the control of RNC 400-1 and MBSFN cluster 700-2 under the control of RNC 400-2 are formed respectively.

Node B 500 is a node provided with a function of setting radio resources in an S-CCPCH based on instructions from RNCs 400-1 and 400-2 and a function of converting MBMS data sent from RNCs 400-1 and 400-2 to radio data and transmitting the radio data to UE 800 in cell 600 through the S-CCPCH. Since details of these operations are defined in 3GPP and are commonly known, descriptions thereof will be omitted.

Here, with reference to FIG. 2, gains of UE 800 when MBSFN is used will be described in comparison with gains when MBSFN is not used. In FIG. 2, (a) shows frequency utilization efficiency of UE 800 when MBSFN is used, disclosed in Table 7 of Non Patent Literature 2 and (b) shows frequency utilization efficiency of UE 800 when MBSFN is not used, disclosed in Table 8 of Non Patent Literature 2.

First, a case will be described as an example where UE 800 is a Type-3 receiver and has a configuration of combining signals received through three radio links (receiver capable of equalizing 3RLs, RL=Radio Link). In this case, the frequency utilization efficiency is 0.602 [b/s/Hz] when MBSFN is used, whereas the frequency utilization efficiency is as low as 0.4736 [b/s/Hz] when MBSFN is not used. On the other hand, when there are seven radio links, the frequency utilization efficiency is 1.075 [b/s/Hz] when MBSFN is used, which is significantly different from 0.4736 [b/s/Hz] when MBSFN is not used.

It is obvious from this result that gains of UE 800 are very small when MBSFN is not used.

CITATION LIST

Non Patent Literature

Non Patent Literature 1: 3GPP TS 23.246
Non Patent Literature 2: 3GPP TS 25.905
Non Patent Literature 3: 3GPP TS 29.061
Non Patent Literature 4: 3GPP TS 29.060
Non Patent Literature 5: 3GPP TS 25.413
Non Patent Literature 6: 3GPP TS 25.402
Non Patent Literature 7: 3GPP TS 24.008

SUMMARY OF INVENTION

Technical Problem

However, in different RNCs of the related mobile communication system, there is no means for unifying S-CCPCH radio resources in cells under their control and MBMS data transmission timing, and therefore each RNC independently determines radio resources in a cell under its control and transmission timing.

For this reason, one MBSFN cluster can only be formed for each RNC and cannot be formed extending over different RNCs. That is, one MBSFN cluster cannot be formed between cells under the control of different RNCs.

Therefore, in the vicinity of a boundary of cells of Nodes B connected to different RNCs, since a UE is located on a boundary of MBSFN clusters, there is a problem in which the effect of MBSFN of receiving MBMS data with large gains is lessened.

Moreover, assuming the number of Nodes B connected to one RNC is constant, a communication area where there are more UEs requires more Nodes B. Thus, the communication area covered by one RNC shrinks in size. This means that there are more boundaries of communication areas of RNCs in areas where there are more UEs.

Therefore, even when one MBSFN cluster is formed for each RNC, more boundaries of MBSFN clusters are formed in areas where there are more UEs, and there is a problem in which the effect of MBSFN is lessened.

It is therefore an object of the present invention to provide a mobile communication system, a core network node, a control station, a base station, a communication method and a program that, by expanding the range of an MBSFN cluster, reduces the number of boundaries of MBSFN clusters, and thereby solves the above described problems.

Solution to Problem

A first mobile communication system of the present invention is a mobile communication system including
 a mobile station,
 base stations each of which forms a cell and transmits MBMS data to the mobile station in the cell and
 control stations each of which controls a base station connected thereto,
 and further including
 a core network node that instructs each of the control stations connected thereto with respect to the frequency and timing for transmitting MBMS data in the cell,
  wherein each of the control stations
  establishes time synchronization with another control station,
  instructs the connected base station to set the cell to the frequency designated by the core network node,
  transmits, to the connected base station, the MBMS data in accordance with the transmission timing designated by the core network node and
  the mobile station receives the MBMS data.

A second mobile communication system of the present invention is a mobile communication system including
 a mobile station and
 base stations each of which forms a cell and transmits MBMS data to the mobile station in the cell,
 and further including
 a core network node that instructs each of the control stations connected thereto with respect to the frequency and timing for transmitting MBMS data in the cell,
  wherein the base station
  establishes time synchronization with another base station,
  sets the cell to the frequency designated by the core network node,
  transmits the MBMS data to the mobile station at transmission timing designated by the core network node and
  the mobile station receives the MBMS data.

A core network node of the present invention is a core network node connected to base stations each of which forms a cell and transmits MBMS data to a mobile station in the cell, including
 a communication unit that instructs a base station connected thereto or a control station connected to the base station with respect to the frequency and timing for transmitting the MBMS data in the cell.

A control station of the present invention is a control station connected to base stations each of which forms a cell and transmits MBMS data to a mobile station in the cell, including
 a time synchronization unit that establishes time synchronization with another control station and
 a communication unit that receives an instruction from a higher core network node with respect to the frequency and timing for transmitting the MBMS data in the cell, instructs a base station connected thereto to set the cell to the frequency designated by the core network node and transmits the MBMS data in accordance with the transmission timing designated by the core network node.

A base station of the present invention is a base station that forms a cell and transmits MBMS data to a mobile station in the cell, including
 a time synchronization unit that establishes time synchronization with another base station
 a communication unit that receives an instruction from a higher core network node with respect to the frequency and timing for transmitting the MBMS data in the cell and transmits the MBMS data to the mobile station in accordance with the transmission timing designated by the core network node and
 a control unit that sets the cell to the frequency designated by the core network node.

A first communication method of the present invention is a communication method by a mobile communication system made up of a mobile station, base stations each of which forms a cell and transmits MBMS data to the mobile station in the cell, control stations each of which controls a base station connected thereto and a core network node connected to the control stations, including the steps of
 the core network node instructing a control station connected thereto with respect to the frequency and timing for transmitting the MBMS data in the cell, the control station establishing time synchronization with another control station, the control station instructing the connected base station to set the cell to the frequency designated by the core network node, the control station transmitting, to the connected base station, the MBMS data in accordance with the transmission timing designated by the core network node and the mobile station receiving the MBMS data.

A second communication method of the present invention is a communication method by a mobile communication system made up of a mobile station, base stations each of which forms a cell and transmits MBMS data to the mobile station in the cell and a core network node connected to the base stations, including the steps of the core network node instructing a base station connected thereto with respect to the frequency and timing for transmitting the MBMS data in the cell, the base station establishing time synchronization with another base station, the base station setting the cell to the frequency designated by the core network node, the base station transmitting the MBMS data to the mobile station in accordance with the transmission timing designated by the core network node and the mobile station receiving the MBMS data.

A third communication method of the present invention is a communication method by a core network node connected to base stations each of which forms a cell and transmits MBMS data to a mobile station in the cell, including the steps of instructing a base station connected thereto or a control station connected to the base station with respect to the frequency and timing for transmitting the MBMS data in the cell.

A fourth communication method of the present invention is a communication method by a control station connected to base stations each of which forms a cell and transmits MBMS data to a mobile station in the cell, including the steps of establishing time synchronization with another control station, receiving an instruction with respect to the frequency and timing for transmitting the MBMS data in the cell from a higher core network node, instructing a base station connected thereto to set the cell to the frequency designated by the core network node and transmitting the MBMS data to the connected base station in accordance with the transmission timing designated by the core network node.

A fifth communication method of the present invention is a communication method by a base station which forms a cell and transmits MBMS data to a mobile station in the cell, including the steps of establishing time synchronization with another base station, receiving an instruction with respect to the frequency and timing for transmitting the MBMS data in the cell from a higher core network node, transmitting the MBMS data to a mobile station in accordance with the transmission timing designated by the core network node and setting the cell to the frequency designated by the core network node.

A first program of the present invention causes a core network node connected to base stations each of which forms a cell and transmits MBMS data to a mobile station in the cell to execute the processes of instructing a base station connected thereto or a control station connected to the base station with respect to the frequency and timing for transmitting the MBMS data in the cell.

A second program of the present invention causes a control station connected to base stations each of which forms a cell and transmits MBMS data to a mobile station in the cell to execute the processes of establishing time synchronization with another control station, receiving an instruction with respect to the frequency and timing for transmitting the MBMS data in the cell from a higher core network node, instructing a base station connected thereto to set the cell to the frequency designated by the core network node and transmitting the MBMS data to the connected base station in accordance with the transmission timing designated by the core network node.

A third program of the present invention causes a base station which forms a cell and transmits MBMS data to a mobile station in the cell to execute the processes of establishing time synchronization with another base station, receiving an instruction with respect to the frequency and timing for transmitting the MBMS data in the cell from a higher core network node, transmitting the MBMS data to the mobile station in accordance with the transmission timing designated by the core network node and setting the cell to the frequency designated by the core network node.

Advantageous Effects of Invention

According to the present invention, it is possible to transmit the same MBMS data using the same frequency and at the same transmission timing in all cells under the control of a core network node.

Therefore, the present invention provides an advantage of being able to expand a range of communication area made up of a plurality of cells in which the same MBMS data are transmitted using the same frequency and at the same transmission timing.

BRIEF DESCRIPTION OF DRAWINGS

FIG. 2 is a diagram illustrating gains of a UE when MBSFN is used;

FIG. 7 is a diagram illustrating an example of a Session Start Request message transmitted from the BM-SC to GGSN in step S10 shown in FIG. 5;

FIG. 8 is a diagram illustrating an example of an MBMS Session Start Request message transmitted from the GGSN to SGSN in step S20 shown in FIG. 5;

FIG. 9 is a diagram illustrating an example of an MBMS Session Start Request message transmitted from the SGSN to RNC in step S30 shown in FIG. 5;

FIG. 11 is a diagram illustrating another example of the Session Start Request message transmitted from the BM-SC to GGSN in step S10 shown in FIG. 5;

FIG. 12 is a diagram illustrating another example of the MBMS Session Start Request message transmitted from the GGSN to SGSN in step S20 shown in FIG. 5;

FIG. 13 is a diagram illustrating another example of the MBMS Session Start Request message transmitted from the SGSN to RNC in step S30 shown in FIG. 5;

FIG. 14 is a diagram illustrating an example of a database stored in the storage unit of the RNC shown in FIG. 10;

FIG. 15 is a diagram illustrating a further example of the Session Start Request message transmitted from the BM-SC to GGSN in step S10 shown in FIG. 5;

FIG. 16 is a diagram illustrating a configuration of TMGI shown in FIG. 15;

FIG. 17 is a diagram illustrating an example of the MBMS Service ID shown in FIG. 16 broken down into three parts;

FIG. 18 is a diagram illustrating another example of the database stored in the storage unit of the RNC shown in FIG. 10;

DESCRIPTION OF EMBODIMENTS

Hereinafter, exemplary embodiments of the present invention will be described with reference to the accompanying drawings.

Figure 1:
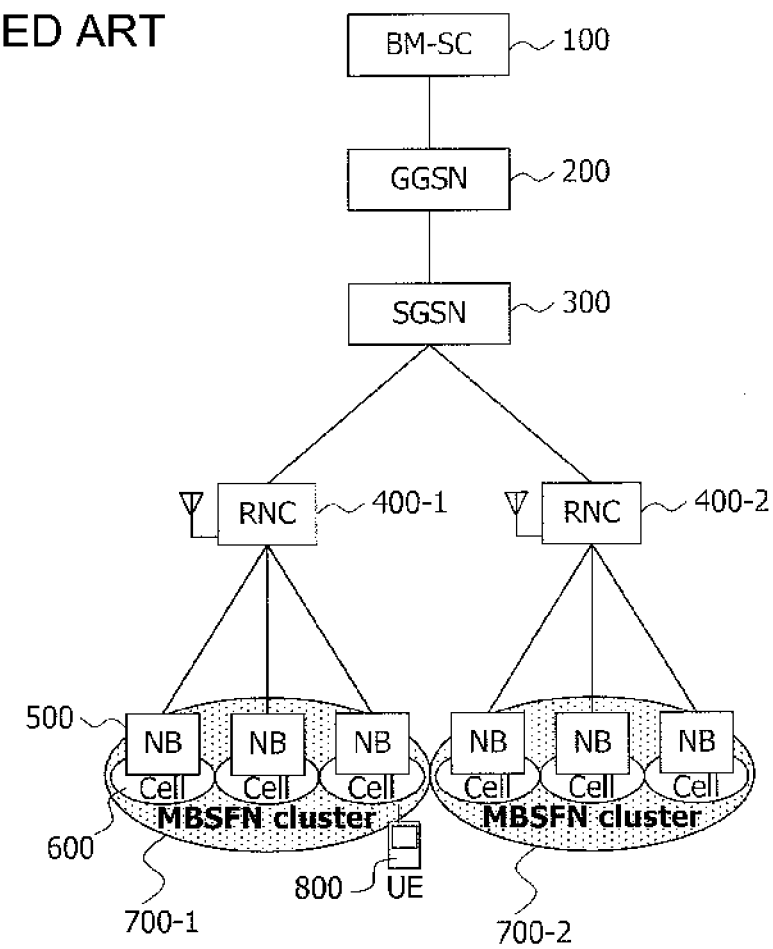
FIG. 1 is a block diagram illustrating an example of a configuration of a related mobile communication system.
Figure 3:
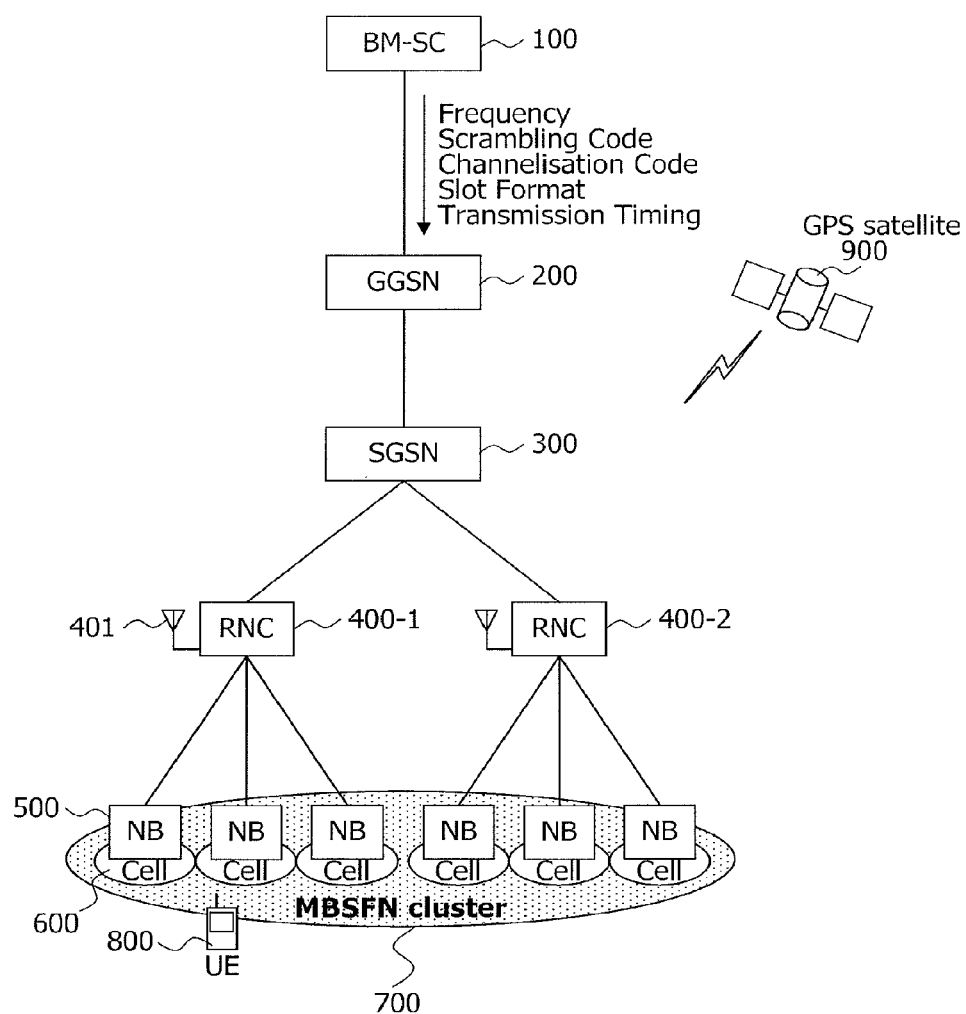
FIG. 3 is a diagram illustrating an example of a configuration of a mobile communication system of the present invention.

(1) First Exemplary Embodiment (1-1) Configuration of First Exemplary Embodiment As shown in FIG. 3, although an overall configuration of the mobile communication system of the present exemplary embodiment is the same as that in FIG. 1, functions are added to BM-SC 100, GGSN 200, SGSN 300, and RNCs 400-1 and 400-2.

Thus, configurations of BM-SC 100, GGSN 200, SGSN 300, and RNCs 400-1 and 400-2 will be described with reference to FIG. 4.

Figure 4:
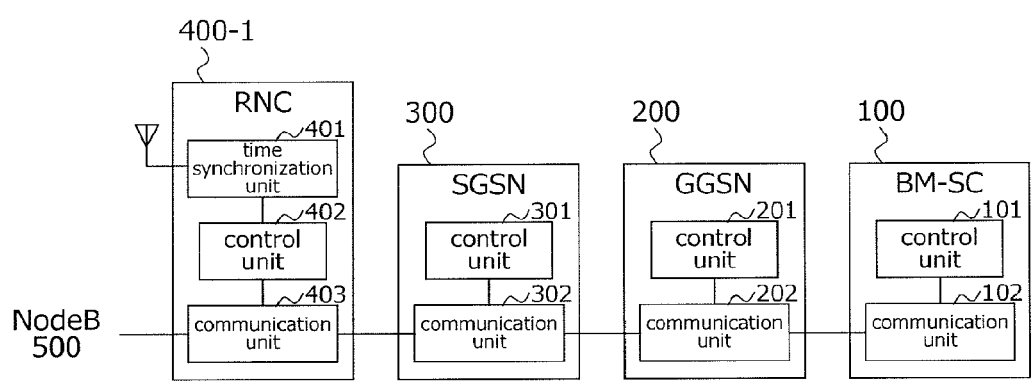
FIG. 4 is a block diagram illustrating an example of a configuration of the BM-SC, GGSN, SGSN and RNC shown in FIG. 3.

As shown in FIG. 4, BM-SC 100 serves as a core network node to instruct RNCs 400-1 and 400-2 with respect to MBSFN information that is necessary to form MBSFN cluster 700 under the control of RNCs 400-1 and 400-2 via GGSN 200 and SGSN 300 and includes control unit 101 and communication unit 102.

Control unit 101 generates a message to be transmitted to GGSN 200. For example, in the present exemplary embodiment, control unit 101 generates, as MBSFN information, a message including set values of radio resources of S-CCPCH (frequency, scrambling code, channelisation code, slot format) in cell 600 under control thereof and set values of transmission timing of MBMS data (e.g., transmission time in hour/minute units such as x hours y minutes). Although the set values of the radio resources and transmission timing may be manually set by a system administrator in, for example, BM-SC 100, this is not exclusive.

In addition to the aforementioned operations, control unit 101 controls BM-SC 100 as a whole and performs various types of operation, for example, user authentication described in FIG. 1, MBMS data management and delivery scheduling.

Communication unit 102 transmits/receives messages and MBMS data to/from GGSN 200. For example, in the present exemplary embodiment, communication unit 102 transmits a message including set values of radio resources and transmission timing generated by control unit 101 to GGSN 200.

GGSN 200 includes control unit 201 and communication unit 202.

Control unit 201 generates messages to be transmitted to BM-SC 100 and SGSN 300. For example, in the present exemplary embodiment, control unit 201 generates messages including set values of radio resources and transmission timing reported from BM-SC 100.

In addition to the aforementioned operation, control unit 201 controls GGSN 200 as a whole and performs various types of operation.

Communication unit 202 transmits/receives messages and MBMS data to/from BM-SC 100 and SGSN 300. For example, in the present exemplary embodiment, communication unit 202 receives a message including set values of radio resources and transmission timing from BM-SC 100 and transmits a message including set values of radio resources and transmission timing generated by control unit 201 to SGSN 300.

SGSN 300 includes control unit 301 and communication unit 302.

Control unit 301 generates a message to be transmitted to GGSN 200, and RNCs 400-1 and 400-2. For example, in the present exemplary embodiment, control unit 301 generates a message including set values of radio resources and transmission timing reported from GGSN 200.

In addition to the aforementioned operation, control unit 301 controls SGSN 300 as a whole and performs various types of operation such as routing, mobility management and session management described in FIG. 1.

Communication unit 302 transmits/receives messages and MBMS data to/from GGSN 200, and RNCs 400-1 and 400-2. For example, in the present exemplary embodiment, communication unit 302 receives a message including set values of radio resources and transmission timing from GGSN 200 and transmits a message including set values of radio resources and transmission timing generated by control unit 301 to RNC 400-1. This message is also transmitted to RNC 400-2.

RNC 400-1 includes time synchronization unit 401, control unit 402 and communication unit 403. RNC 400-2 also has a configuration similar to that of RNC 400-1.

Time synchronization unit 401 receives time information of UTC (Coordinated Universal Time) from GPS (Global Positioning System) satellite 900 and synchronizes time of RNC 400-1 with UTC. Since the method of time synchronization with UTC by GPS is commonly known, descriptions thereof will be omitted.

In this case, RNC 400-2 also establishes time synchronization with UTC.

This makes it possible to establish time synchronization between RNCs 400-1 and 400-2.

The method of establishing time synchronization between RNCs 400-1 and 400-2 is not limited to the aforementioned method using GPS, but the following methods defined in 3GPP can also be used.

- 3GPP synchronization method in UTRAN (UMTS Terrestrial Radio Access Network, UMTS=Universal Mobile Telecommunications System) (3GPP synchronization in UTRAN)
- Method using NTP (Network Time Protocol)
- Method using IP multicast distribution (Relying on IP multicast distribution)
- Method defined in IEEE (Institute of Electrical and Electronic Engineers) 1588

Control unit 402 generates messages and instructions to be transmitted to SGSN 300 and Node B 500. For example, in the present exemplary embodiment, control unit 402 generates an instruction for setting the set values of radio resources reported from SGSN 300 in S-CCPCH.

Furthermore, control unit 402 can recognize a timing difference between RNC 400-1 and each Node B 500 under control thereof, using a node synchronization procedure described in Non Patent Literature 6. This allows control unit 402 to recognize at which timing MBMS data should be transmitted to each Node B 500 under control thereof so that MBMS data is transmitted to all cells 600 under control thereof at the same transmission timing. Thus, control unit 402 schedules timing of MBMS data to be transmitted to each Node B 500 under control thereof so that MBMS data is transmitted to all cells 600 under control thereof at the transmission timing reported from SGSN 300.

In addition to the aforementioned operation, control unit 402 controls RNC 400-1 as a whole and performs various types of operation.

Communication unit 403 transmits/receives messages, MBMS data and instructions to/from SGSN 300 and Node B 500. For example, in the present exemplary embodiment, communication unit 403 receives messages including set values of radio resources and transmission timing from SGSN 300 and transmits, to all Nodes B 500 under the control of RNC 400-1, an instruction for setting the radio resources generated by control unit 402 and reported from SGSN 300 in S-CCPCH.

In this case, RNC 400-2 likewise transmits, to all Nodes B 500 under the control of RNC 400-2, an instruction for setting the radio resources reported from SGSN 300 in S-CCPCH.

This allows all cells 600 under the control of RNCs 400-1 and 400-2 to use the same radio resources for S-CCPCH.

Furthermore, communication unit 403 transmits MBMS data to each Node B 500 under the control of RNC 400-1 at timing scheduled by control unit 402. This allows transmission timing of MBMS data in all cells 600 under control thereof to match the transmission timing reported from SGSN 300.

In this case, RNC 400-2 likewise performs scheduling so that transmission timing of MBMS data in all cells 600 under control thereof matches the transmission timing reported from SGSN 300.

Furthermore, time synchronization is established between RNCs 400-1 and 400-2.

This allows the same MBMS data to be transmitted at the same transmission timing in all cells 600 under the control of RNCs 400-1 and 400-2.

As described so far, all cells 600 under the control of RNCs 400-1 and 400-2 can transmit the same MBMS data using the same frequency and at the same transmission timing, making it possible to form wide-range MBSFN cluster 700 extending over RNCs 400-1 and 400-2.

(1-2) Operation of First Exemplary Embodiment

Next, operation of the mobile communication system of the present exemplary embodiment at the start of MBMS, that is, at the start of a session, will be described according to a C-plane (Control Plane) sequence chart shown in FIG. 5. The "C-plane" refers to a control plane and shows a protocol for signals used for control in a network.

Figure 5:
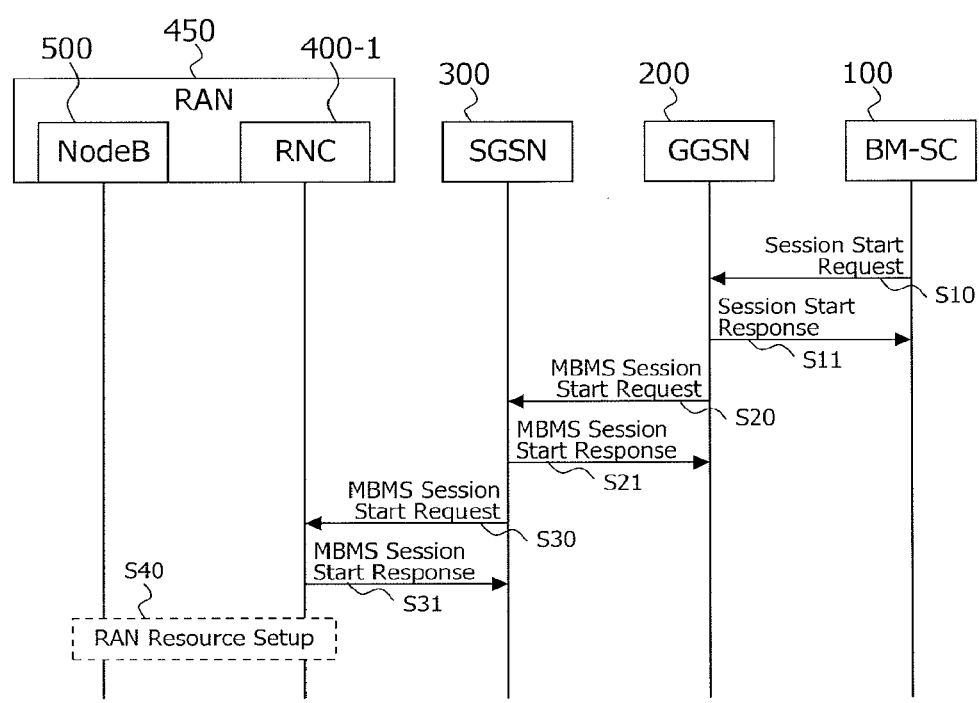
FIG. 5 is a C-plane sequence chart illustrating an example of operation at the start of a session of MBMS in the mobile communication system of the present invention.
Figure 6:
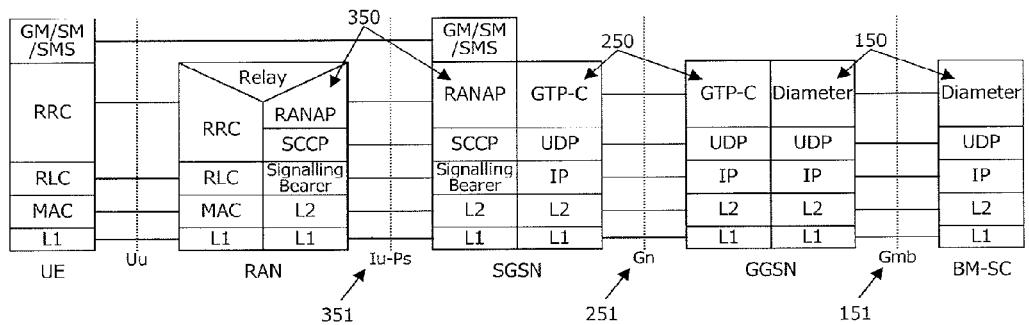
FIG. 6 is a diagram illustrating a C-plane protocol stack used to transmit/receive the C-plane message shown in FIG. 5.

In order to transmit/receive C-plane messages shown in FIG. 5, the present exemplary embodiment uses a C-plane protocol stack shown in FIG. 6 without changing it. Since this protocol stack is defined in 3GPP, detailed descriptions thereof will be omitted.

As shown in FIG. 5, communication unit 102 of BM-SC 100 transmits a Session Start Request message to GGSN 200 at the start of a session of MBMS in step S10. Details of the Session Start Request message are described in Non Patent Literature 3.

In the present exemplary embodiment, control unit 101 of BM-SC 100 newly adds parameters of MBSFN-Frequency 12, MBSFN-Scrambling-Code 13, MBSFN-Channelisation-Code 14, MBSFN-Slot-Format 15 and MBSFN-Tx-Timing 16 in the Session Start Request message in step S10 as shown in FIG. 7. Each Node B 500 uses the set values of frequency, scrambling code, channelization code and slot format in these parameters to set S-CCPCH, and each Node B 500 transmits MBMS data with a set value of the transmission timing.

Next, communication unit 202 of GGSN 200 returns a Session Start Response message which is a response message to the Session Start Request message to BM-SC 100 in step S11.

The Session Start Request message and Session Start Response message transmitted and received between BM-SC 100 and GGSN 200 are transmitted through Gmb interface 151 shown in FIG. 6 using Diameter Protocol 150. Details of Diameter Protocol 150 are described in Non Patent Literature 3.

Next, communication unit 202 of GGSN 200 transmits an MBMS Session Start Request message to SGSN 300 in step S20.

In the present exemplary embodiment, control unit 201 of GGSN 200 newly adds parameters corresponding to MBSFN-Frequency 12, MBSFN-Scrambling-Code 13, MBSFN-Channelisation-Code 14, MBSFN-Slot-Format 15 and MBSFN-Tx-Timing 16, included in the above Session Start Request message as shown in FIG. 8, in the MBMS Session Start Request message in step S20. Suppose the number of bits of each of these parameters is the same as the number of bits of the parameters included in the Session Start Request message.

Next, communication unit 302 of SGSN 300 returns an MBMS Session Start Response message which is a response message to the MBMS Session Start Request message to GGSN 200 in step S21.

The MBMS Session Start Request message and MBMS Session Start Response message transmitted and received between GGSN 200 and SGSN 300 are transmitted through Gn interface 251 shown in FIG. 6, using GTP-C Protocol 250. Details of GTP-C Protocol 250 are described in Non Patent Literature 4.

Next, communication unit 302 of SGSN 300 transmits an MBMS Session Start Request message to RNCs 400-1 and 400-2 in step S30. Details of the MBMS Session Start Request message are described in Non Patent Literature 5.

In the present exemplary embodiment, control unit 301 of SGSN 300 adds a group called "MBSFN Information" as shown in FIG. 9 in the MBMS Session Start Request message in step S30 and includes therein MBSFN-Frequency, MBSFN-Scrambling-Code, MBSFN-Channelisation-Code, MBSFN-Slot-Format and MBSFN-Tx-Timing as IE (Information Element) to be new parameters.

Control unit 402 of RNC 400-1 can recognize an S-CCPCH frequency of cell 600 under control thereof from MBSFN-Frequency, can recognize scrambling code from MBSFN-Scrambling-Code, can recognize channelisation code from MBSFN-Channelisation-Code, can recognize slot format from MBSFN-Slot-Format and can recognize timing for transmitting the MBMS data from MBSFN-Tx-Timing respectively designated by BM-SC 100. RNC 400-2 can likewise recognize the same.

Next, communication unit 403 of RNC 400-1 returns an MBMS Session Start Response message which is a response message to the MBMS Session Start Request message to SGSN 300 in step S31. RNC 400-2 likewise returns an MBMS Session Start Response message.

The MBMS Session Start Request message and MBMS Session Start Response message transmitted and received between SGSN 300, and RNC 400-1 and 400-2 are transmitted through Iu-PS interface 351 shown in FIG. 6, using RANAP Protocol 350. Details of RANAP Protocol 350 are described in Non Patent Literature 5.

In step S40, a RAN resource setup procedure is executed between RNC 400-1 and Node B 500 under control thereof.

In the RAN resource setup procedure, communication unit 403 of RNC 400-1 transmits, to all Node Bs 500 under control thereof, an instruction for setting the set values of frequency, scrambling code, channelisation code and slot format designated by BM-SC 100 in S-CCPCH. Upon receiving this, all Nodes B 500 under the control of RNC 400-1 set these radio resources in S-CCPCH.

Likewise, all Nodes B 500 under the control of RNC 400-2 set the set values of radio resources designated by BM-SC 100 in S-CCPCH.

This allows all cells 600 under the control of RNCs 400-1 and 400-2 to use the same radio resources for S-CCPCH.

Furthermore, time synchronization unit 401 of RNC 400-1 receives time information of UTC from GPS satellite 900 and synchronizes time of RNC 400-1 with UTC.

Likewise, time of RNC 400-2 is also synchronized with UTC.

This makes it possible to establish time synchronization between RNCs 400-1 and 400-2.

Furthermore, control unit 402 of RNC 400-1 performs scheduling so that transmission timing of MBMS data in all cells 600 under control thereof matches the set values of transmission timing designated by BM-SC 100.

In RNC 400-2, transmission timing of MBMS data in all cells 600 under control thereof is likewise made to match the set values of transmission timing designated by BM-SC 100.

This allows all cells 600 under the control of RNCs 400-1 and 400-2 to transmit the same MBMS data at the same transmission timing.

As described above, in the present exemplary embodiment, all cells 600 under the control of RNCs 400-1 and 400-2 can transmit the same MBMS data at the same transmission timing using the same frequency, and can thereby form wide-range MBSFN cluster 700 extending over RNCs 400-1 and 400-2.

Therefore, UE 800 can obtain the effect of MBSFN even when located at a position on boundary between the communication area of RNC 400-1 and the communication area of RNC 400-2.

Furthermore, UE 800 can continuously receive MBMS data without being aware of differences in RNC, differences in Node B and differences in cell.

(2) Second Exemplary Embodiment (2-1) Configuration of Second Exemplary Embodiment The overall configuration of a mobile communication system of the present exemplary embodiment is similar to that in FIG. 3.

In the present exemplary embodiment, BM-SC 100 reports not set values of radio resources themselves of the MBSFN information as in the case of the aforementioned first exemplary embodiment but MBSFN-Indicator which is an identifier indicating a combination of these set values as the information of set values of radio resources in each cell 600.

Figure 10:
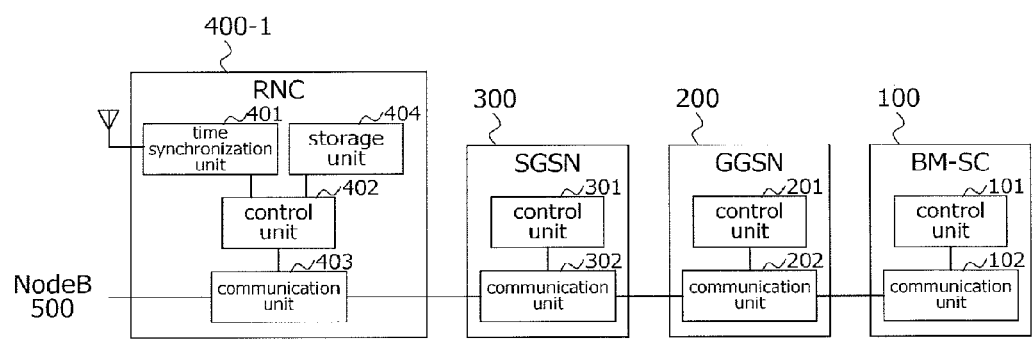
FIG. 10 is a block diagram illustrating another example of the configuration of the BM-SC, GGSN, SGSN and RNC shown in FIG. 3.

Thus, as shown in FIG. 10, RNC 400-1 adopts a configuration with storage unit 404 that stores a table which associates the above described MBSFN-Indicator with a combination of set values of radio resources added to the configuration in FIG. 4. The same applies to RNC 400-2, too.

(2-2) Operation of Second Exemplary Embodiment

Since the C-plane sequence chart at the start of a session of MBMS of the mobile communication system of the present exemplary embodiment is similar to that in FIG. 5, descriptions thereof will be omitted.

However, in the present exemplary embodiment, control unit 101 of BM-SC 100 newly adds parameters of MBSFN-Tx-Timing 16 and MBSFN-Indicator 17 as shown in FIG. 11 in the Session Start Request message in step S10.

MBSFN-Indicator 17 becomes an identifier for instructing RNCs 400-1 and 400-2 with respect to use or non-use of MBSFN or a combination of set values of radio resources when MBSFN is used. In the present exemplary embodiment, assume that MBSFN-Indicator 17 is a 4-bit parameter.

Furthermore, in the present exemplary embodiment, control unit 201 of GGSN 200 newly adds parameters corresponding to MBSFN-Tx-Timing 16 and MBSFN-Indicator 17 included in the above described Session Start Request message as shown in FIG. 12 in the MBMS Session Start Request message in step S20.

Furthermore, in the present exemplary embodiment, control unit 301 of SGSN 300 includes MBSFN-Tx-Timing and MBSFN-Indicator as a new IE in MBSFN Information as shown in FIG. 13 in the MBMS Session Start Request message in step S30.

Furthermore, in the present exemplary embodiment, storage unit 404 of RNC 400-1 stores a database as shown in FIG. 14 beforehand.

Upon receiving a MBMS Session Start Request message in step S30, control unit 402 of RNC 400-1 refers to the database in FIG. 14 using the value of MBSFN-Indicator included therein as an argument.

In the example in FIG. 14, when the value of MBSFN-Indicator is 0, control unit 402 of RNC 400-1 determines not to use MBSFN and performs conventional processing of MBMS. In this case, the value of MBSFN-Tx-Timing is ignored.

On the other hand, when the value of MBSFN-Indicator is other than 0, control unit 402 of RNC 400-1 determines to use MBSFN, selects the combination of the set values of frequency, scrambling code, channelisation code and slot format corresponding to the value, generates an instruction for setting these set values of radio resources in S-CCPCH and transmits the instruction from communication unit 403 to Node B 500 under control thereof.

Furthermore, control unit 402 of RNC 400-1 recognizes the set value of transmission timing of MBMS data from MBSFN-Tx-Timing as in the case of the first exemplary embodiment, performs scheduling and thereby matches the transmission timing of MBMS data among all cells 600 under control thereof.

In RNC 400-2, frequency, scrambling code, channelisation code and slot format are likewise set in S-CCPCH in cell 600 under control thereof and the transmission timing of MBMS data is matched.

As described above, in the present exemplary embodiment, BM-SC 100 can instruct RNCs 400-1 and 400-2 with respect to use or non-use of MBSFN and a combination of set values of radio resources when MBSFN is used using MBSFN-Indicator.

Thus, the present exemplary embodiment can also form wide-range MBSFN cluster 700 extending over RNCs 400-1 and 400-2.

(3) Third Exemplary Embodiment (3-1) Configuration of Third Exemplary Embodiment An overall configuration of a mobile communication system of the present exemplary embodiment is similar to that in FIG. 3.

Furthermore, configurations of BM-SC 100, GGSN 200, SGSN 300, and RNCs 400-1 and 400-2 of the present exemplary embodiment are similar to those in FIG. 10.

(3-2) Operation of Third Exemplary Embodiment

Since a C-plane sequence chart of the mobile communication system of the present exemplary embodiment at the start of a session of MBMS is similar to that in FIG. 5, descriptions thereof will be omitted.

However, the present exemplary embodiment, when transmitting MBSFN information to RNCs 400-1 and 400-2, BM-SC 100, GGSN 200 and SGSN 300, do not newly add parameters to messages but use parameters of TMGI (Temporary Mobile Group Identity) that is defined based on these messages.

Here, a case with the Session Start Request message in step S10 will be described as an example.

As shown in FIG. 15, TMGI 18 is originally defined in the Session Start Request message. TMGI 18 has a configuration as shown in FIG. 16. Details of the configuration of TMGI 18 are described in Non Patent Literature 7.

The present exemplary embodiment focuses attention on MBMS Service ID 170 included in TMGI 18.

MBMS Service ID 170 is originally made up of three octets, that is, 24 bits.

The present exemplary embodiment breaks down the 24 bits of MBMS Service ID 170 into three parts as shown in FIG. 17. Part 1 corresponds to one bit, specifically the 24th bit, part 2 corresponds to seven bits, specifically the 17th to 23rd bits and part 3 corresponds to 16 bits, specifically the first to 16th bits. Parts 1 to 3 are assigned the following roles respectively.

Part 1: Use or non-use of MBSFN. "1" in this bit means use of MBSFN and "0" means non-use.

Part 2: Parameter of MBSFN. This defines radio resources of S-CCPCH and timing for transmitting the MBMS data in cell 600 under the control of RNCs 400-1 and 400-2.

Part 3: Service ID. This indicates Service ID.

The method of categorization of the aforementioned parts is an example and is not limited to this. There can be empty bits among the 24 bits of MBMS Service ID 170.

Furthermore, TMGI's defined in the MBMS Session Start Request messages in steps S20 and S30 are also assigned the above described roles.

Storage unit 404 of RNC 400-1 stores a database as shown in FIG. 18 beforehand.

Upon receiving the MBMS Session Start Request message in step S30, control unit 402 of RNC 400-1 determines to use MBSFN when "1" is set in the bit of part 1 of TMGI included in this and refers to the database in FIG. 18 using the values of seven bits of part 2 as an argument.

In the database in FIG. 14 used in the above described second exemplary embodiment, since the argument has 4 bits, only four set values of frequency, scrambling code, channelisation code and slot format can be defined.

Thus, in the second exemplary embodiment, set values of transmission timing of MBMS data are defined using different parameters and reported from BM-SC 100 to RNCs 400-1 and 400-2.

By contrast, since the argument in the database in FIG. 18 used in the present exemplary embodiment has 7 bits, the set value of transmission timing is also defined in the database.

For example, in the database in FIG. 18, the transmission timing is definable only in minute units of transmission time. When the current time is 16:55 and "0" is set in the transmission timing, control unit 402 of RNC 400-1 performs scheduling such that MBMS data is transmitted from Node B 500 at 17:00 which corresponds to the next time "0" minutes are set.

On the other hand, control unit 402 of RNC 400-1 determines not to use MBSFN when "0" is set in the bit of part 1 of TMGI included in the MBMS Session Start Request message in step S30, does not handle the values of part 2 and handles the values of part 3 as MBMS Service ID.

Likewise, RNC 400-2 can also recognize radio resources and transmission timing in cells 600 under control thereof from parameters of TMGI.

As described above, in the present exemplary embodiment, BM-SC 100 can also use TMGI to instruct RNCs 400-1 and 400-2 with respect to use or non-use of MBSFN, and a combination of set values of radio resources and transmission timing when MBSFN is used.

Thus, the present exemplary embodiment can also form wide-range MBSFN cluster 700 extending over RNCs 400-1 and 400-2.

(4) Fourth Exemplary Embodiment

(4-1) Configuration of Fourth Exemplary Embodiment

An overall configuration of a mobile communication system of the present exemplary embodiment is similar to that in FIG. 3.

Furthermore, configurations of BM-SC 100, GGSN 200, SGSN 300, and RNCs 400-1 and 400-2 of the present exemplary embodiment are also similar to those in FIG. 4 or FIG. 10.

(4-2) Operation of Fourth Exemplary Embodiment

Since a C-plane sequence chart of the mobile communication system of the present exemplary embodiment at the start of a session of MBMS is similar to that in FIG. 5, descriptions thereof will be omitted.

However, in the present exemplary embodiment, BM-SC 100 reports only the information indicating use or non-use of MBSFN of the MBSFN information to RNCs 400-1 and 400-2 through the Session Start Request message in step S10. As the reporting method in this case, a method similar to one of the aforementioned first to third exemplary embodiments can be used.

BM-SC 100 then reports, to RNCs 400-1 and 400-2, information of set values of radio resources of S-CCPCH and timing for transmitting the MBMS data in cells 600 under control thereof of the MBSFN information through a different message. As the reporting method in this case, it is possible to use one of a method of reporting set values themselves as in the case of the aforementioned first exemplary embodiment and a method of reporting MBSFN-Indicator indicating a combination of set values as in the case of the aforementioned second and third exemplary embodiments.

Thus, the present exemplary embodiment can also form wide-range MBSFN cluster 700 extending over RNCs 400-1 and 400-2.

(5) Fifth Exemplary Embodiment

(5-1) Configuration of Fifth Exemplary Embodiment

An overall configuration of a mobile communication system of the present exemplary embodiment is similar to that in FIG. 3.

Furthermore, configurations of BM-SC 100, GGSN 200, SGSN 300, and RNCs 400-1 and 400-2 of the present exemplary embodiment are also similar to those in FIG. 10.

(5-2) Operation of Fifth Exemplary Embodiment

In the present exemplary embodiment, when starting a session of MBMS, BM-SC 100 negotiates with RNCs 400-1 and 400-2 under control thereof and determines radio resources of S-CCPCH and timing for transmitting MBMS data in cell 600 under control thereof.

Storage unit 404 of RNCs 400-1 and 400-2 stores a database as shown in FIG. 18 that associates MBSFN-Indicator with a combination of radio resources and transmission timing set values beforehand.

When conducting the above negotiation, communication unit 102 of BM-SC 100 transmits a message including MBSFN-Indicator which is a candidate to be used of MBSFN-Indicator to RNCs 400-1 and 400-2 first.

Upon receiving the message, control unit 402 of RNCs 400-1 and 400-2 determines an MBSFN-Indicator available to control unit 402 itself and transmits a message including the available MBSFN-Indicator to communication unit 403 to BM-SC 100.

Control unit 101 of BM-SC 100 selects one MBSFN-Indicator based on the available MBSFN-Indicator from each of RNCs 400-1 and 400-2. As a criterion in this case, an MBSFN-Indicator available to more RNCs may be selected, but the reference is not particularly limited to this.

Hereinafter, at the start of a session of MBMS, processing will be carried out according to the C-plane sequence chart in FIG. 5 using a method similar to that in the aforementioned third exemplary embodiment. Thus, the MBSFN-Indicator value selected above is reported from BM-SC 100 to RNCs 400-1 and 400-2 and MBSFN cluster 700 is formed.

Thus, the present exemplary embodiment can also form wide-range MBSFN cluster 700 extending over RNCs 400-1 and 400-2.

In the present exemplary embodiment, BM-SC 100 negotiates with RNCs 400-1 and 400-2, but GGSN 200 or SGSN 300 may also negotiate with RNCs 400-1 and 400-2. In this case, GGSN 200 or SGSN 300 serves as the core network node, selects an MBSFN-Indicator and adds the MBSFN-Indicator to an MBMS Session Start Request message.

(6) Sixth Exemplary Embodiment

(6-1) Configuration of Sixth Exemplary Embodiment

The present exemplary embodiment reports MBSFN information that has been reported to one RNC to another RNC via an Iur interface. This can save the resources of the Iu interface between SGSN and RNCs.

Figure 19:
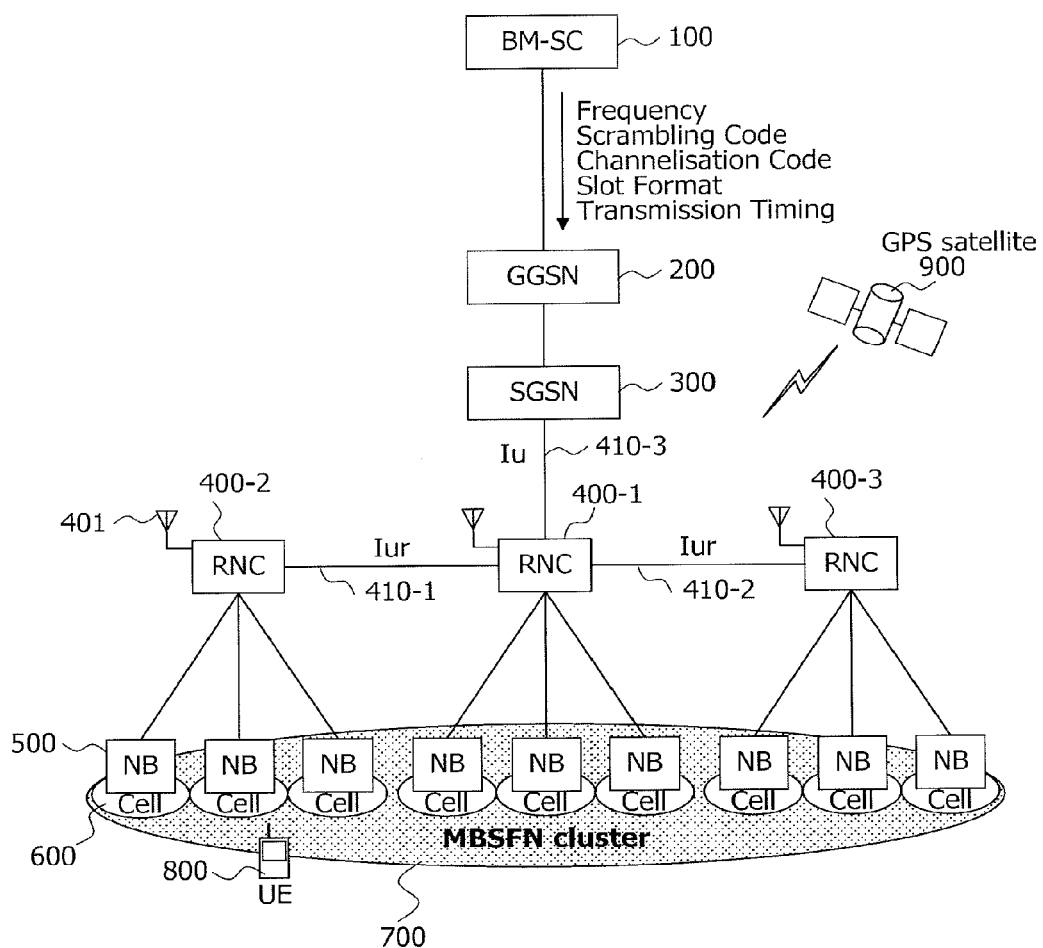
FIG. 19 is a block diagram illustrating another example of the configuration of the mobile communication system of the present invention.

As shown in FIG. 19, an overall configuration of the mobile communication system of the present exemplary embodiment is different from that in FIG. 3 in the following points. FIG. 19 shows three RNCs 400-1~400-3 as RNC 400.

That is, in the mobile communication system of the present exemplary embodiment, only RNC 400-1 of RNCs 400-1~400-3 under the control of SGSN 300 receives MBSFN information reported from SGSN 300 via Iu interface 410-3. Furthermore, RNC 400-1 and RNC 400-2 are connected via Iur interface 410-1 and RNC 400-1 and RNC 400-3 are connected via Iur interface 410-2. Though not shown in the figure, RNC 400-2 and RNC 400-3 are connected to SGSN 300 via an Iu interface.

Figure 20:
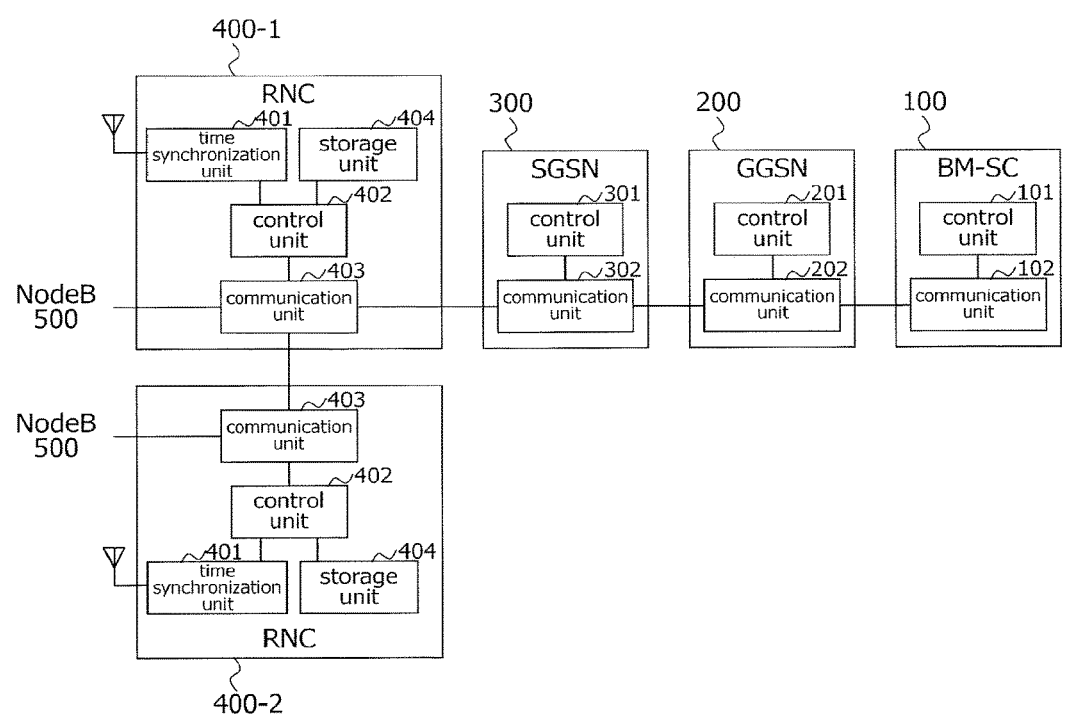
FIG. 20 is a block diagram illustrating an example of the configuration of the BM-SC, GGSN, SGSN and RNC shown in FIG. 19.

Furthermore, as shown in FIG. 20, when compared to FIG. 10, communication unit 403 of RNC 400-1 is further configured to transmit/receive messages and MBMS data to/from another RNC 400 under the control of the same BM-SC 100.

On the other hand, when compared to FIG. 10, communication unit 403 of RNC 400-2 is configured to transmit/receive messages and MBMS data to/from only another RNC 400 under the control of the same BM-SC 100 and not to directly transmit/receive messages and MBMS data to/from SGSN 300. The same applies to RNC 400-3, too.

(6-2) Operation of Sixth Exemplary Embodiment

Since a C-plane sequence chart of the mobile communication system of the present exemplary embodiment at the start of a session of MBMS is similar to that in FIG. 5, descriptions thereof will be omitted.

However, in the aforementioned first to fifth exemplary embodiments, communication unit 102 of BM-SC 100 transmits a Session Start Request message to all RNCs 400-1~400-3 under control thereof, whereas in the present exemplary embodiment, communication unit 102 transmits a Session Start Request message to only one RNC 400 (RNC 400-1 in FIG. 19) under control thereof.

Avoiding transmission of a Session Start Request message to all RNCs 400-1~400-3 can save the resources of the Iu interface between SGSN 300, and RNCs 400-2 and 400-3.

In this case, communication unit 102 of BM-SC 100 can report MBSFN information to RNC 400-1 through the Session Start Request message using a method similar to that in the aforementioned first to third exemplary embodiments.

In this case, communication unit 403 of RNC 400-1 transfers the Session Start Request to another RNC 400 under the control of same BM-SC 100 to which MBMS data is to be transmitted (RNC 400-2, 400-3 in FIG. 19) via Iur interfaces 410-1 and 410-2 respectively.

Alternatively, communication unit 102 of BM-SC 100 can report MBSFN information to RNC 400-1 through the Session Start Request message and another message, using a method similar to that in the aforementioned fourth exemplary embodiment.

In this case, communication unit 403 of RNC 400-1 transfers the Session Start Request message and another message to another RNC 400 under the control of same BM-SC 100 to which MBMS data is to be transmitted (RNC 400-2, 400-3 in FIG. 19) via Iur interfaces 410-1 and 410-2 respectively.

Thus, RNC 400-1 directly receives an instruction on the MBSFN information from BM-SC 100, whereas RNCs 400-2 and 400-3 indirectly receive the instruction on the MBSFN information from BM-SC 100 via RNC 400-1.

RNCs 400-1~400-3 instruct setting of radio resources of S-CCPCH in cell 600 under their control and transmit MBMS data based on the MBSFN information directly or indirectly received from BM-SC 100.

Thus, the present exemplary embodiment can also form wide-range MBSFN cluster 700 extending over RNCs 400-1~400-3.

When the present exemplary embodiment adopts a configuration of reporting an MBSFN-Indicator to RNC 400-1 using a method similar to that of the third exemplary embodiment, BM-SC 100, GGSN 200 or SGSN 300 may negotiate with RNCs 400-1~400-3 over the MBSFN-Indicator as in the case of the fifth exemplary embodiment.

(7) Seventh Exemplary Embodiment

(7-1) Configuration of Seventh Exemplary Embodiment

A mobile communication system of the present exemplary embodiment is an example of case where the present invention is applied to a network of evolved HSPA (High Speed Packet Access) or a network of LTE (Long Term Evolution). These networks can assume a Flat Architecture configuration with an RNC degenerated into a Node B.

Figure 21:
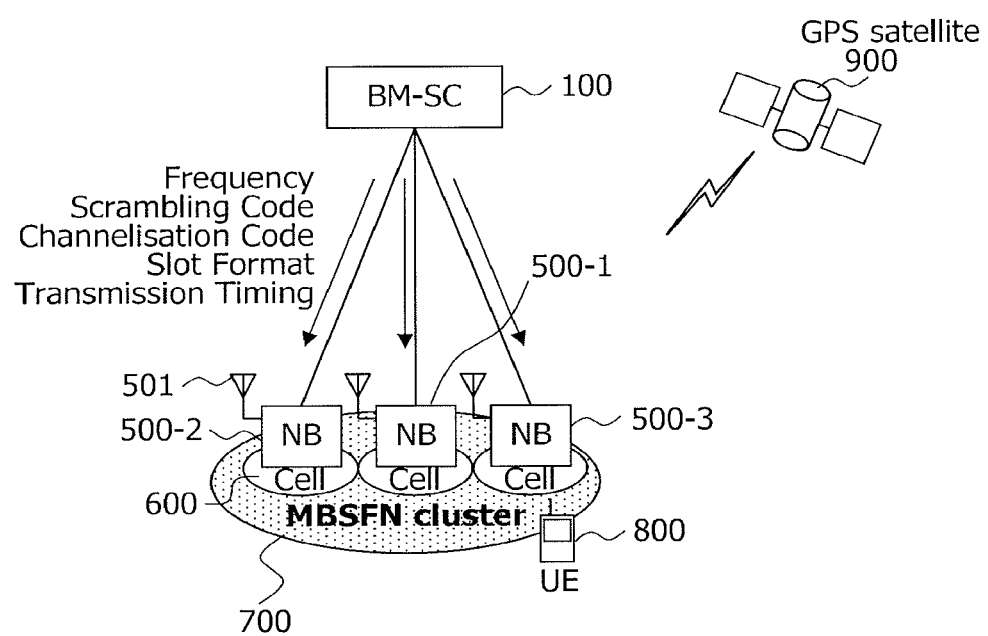
FIG. 21 is a block diagram illustrating a further example of the configuration of the mobile communication system of the present invention.

As shown in FIG. 21, the mobile communication system of the present exemplary embodiment includes BM-SC 100 and Node B 500.

FIG. 21 omits nodes (GGSN and SGSN) between BM-SC 100 and Node B 500 and illustrates a configuration applicable to both networks of evolved HSPA and LTE.

Furthermore, FIG. 21 illustrates three Nodes B 500-1~500-3 as Nodes B 500 and these Nodes B 500-1~500-3 are connected to a CN (not shown) including BM-SC 100.

Figure 22:
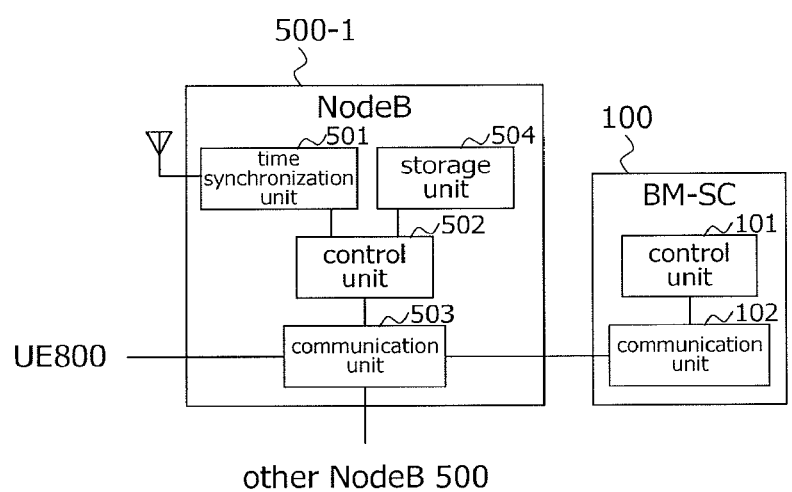
FIG. 22 is a block diagram illustrating an example of the configuration of the BM-SC and Node B shown in FIG. 21.

As shown in FIG. 22, the configuration of BM-SC 100 is similar to that in FIG. 4 or FIG. 10.

Node B 500-1 includes time synchronization unit 501, control unit 502, communication unit 503 and storage unit 504. Nodes B 500-2 and 500-3 also have a configuration similar to that of Node B 500-1.

The present exemplary embodiment corresponds to the first to fifth exemplary embodiments modified to a configuration supporting a Flat Architecture and applies, to Node B 500, a method similar to the above described first to fifth exemplary embodiments applied to RNC 400.

Thus, Node B 500-1 is instructed with regard to MBSFN information from BM-SC 100 as in the case of the aforementioned first to fifth exemplary embodiments.

Furthermore, Node B 500-1 is instructed, as the information on set values of radio resources and transmission timing in cell 600 under control thereof among MBSFN information, set values themselves as in the case of the aforementioned first exemplary embodiment or an MBSFN-Indicator indicating a combination of set values as in the case of the aforementioned second and third exemplary embodiments.

Time synchronization unit 501 receives time information on UTC from GPS satellite 900 and synchronizes time of Node B 500-1 with UTC.

In this case, Nodes B 500-2 and 500-3 likewise establish time synchronization with UTC as well.

This allows time synchronization to be established between Nodes B 500-1~500-3.

The method of establishing time synchronization between Nodes B 500-1~500-3 is not limited to the aforementioned method by GPS, but the method described in FIG. 4 may also be used.

Control unit 502 controls Node B 500-1 as a whole and performs various types of operation. For example, in the present exemplary embodiment, control unit 502 sets the set values of radio resources designated by BM-SC 100 in S-CCPCH.

In this case, Nodes B 500-2 and 500-3 likewise set the set values of radio resources designated by BM-SC 100 in S-CCPCH as well.

This allows all cells 600 under the control of Nodes B 500-1~500-3 to use the same radio resource for S-CCPCH.

Communication unit 503 transmits/receives messages and MBMS data to/from BM-SC 100. For example, in the present exemplary embodiment, communication unit 503 transmits MBMS data at the transmission timing designated by BM-SC 100.

In this case, Nodes B 500-2 and 500-3 likewise transmit MBMS data at the transmission timing designated by BM-SC 100.

Time synchronization is established between Nodes B 500-1~500-3.

This allows all cells 600 under the control of Nodes B 500-1~500-3 to transmit the same MBMS data at the same transmission timing.

Thus, all cells 600 under the control of Nodes B 500-1~500-3 can transmit the same MBMS data using the same frequency and at the same transmission timing, and can thereby form wide-range MBSFN cluster 700 extending over Node B 500-1~500-3.

(7-2) Operation of Seventh Exemplary Embodiment

The present exemplary embodiment also applies, to Node B 500, a method similar to those of the aforementioned first to sixth exemplary embodiments applied to RNC 400, and therefore descriptions of operations thereof will be omitted.

The present exemplary embodiment can also form wide-range MBSFN cluster 700 extending over Nodes B 500-1~500-3.

(8) Eighth Exemplary Embodiment (8-1) Configuration of Eighth Exemplary Embodiment The present exemplary embodiment reports MBSFN information that has been reported to one Node B to another Node B via an interface. This allows resources of the interface between the BM-SC and Node B to be saved.

Figure 23:
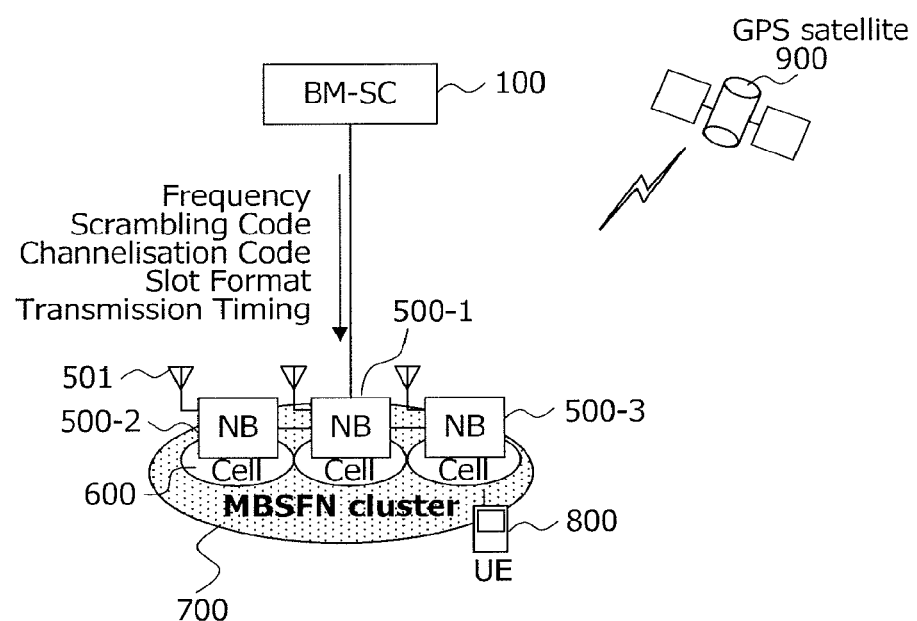
FIG. 23 is a block diagram illustrating a still further example of the configuration of the mobile communication system of the present invention.

As shown in FIG. 23, the mobile communication system of the present exemplary embodiment is different from that in FIG. 21 in that only Node B 500-1 of Nodes B 500-1~500-3 under the control of BM-SC 100 receives a report about MBSFN information from BM-SC 100 and in that Nodes B 500-1~500-3 are connected via an interface. The interface between Nodes B 500-1~500-3 is an X2 interface in the case of an LTE network, for example. Though not shown in the figure, Nodes B 500-2 and RNC 500-3 are connected to BM-SC 100 via an interface.

Figure 24:
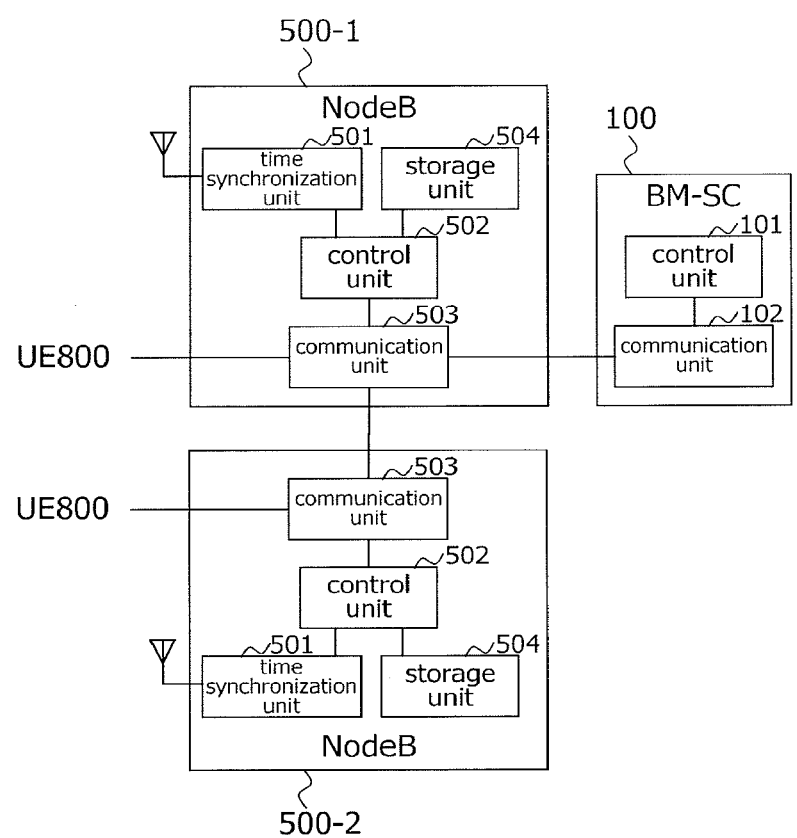
FIG. 24 is a block diagram illustrating an example of the configuration of the BM-SC and Node B shown in FIG. 23.

Furthermore, as shown in FIG. 24, communication unit 503 of Node B 500-1, compared to that in FIG. 22, is further configured to transmit/receive messages and MBMS data to/from another Node B 500.

On the other hand, communication unit 503 of Node B 500-2, compared to that in FIG. 22, is configured only to transmit/receive messages and MBMS data to/from another Node B 500 and not to directly transmit/receive these messages and MBMS data to/from BM-SC 100. The same applies to Node B 500-3, too.

(8-2) Operation of Eighth Exemplary Embodiment

Since the present exemplary embodiment results from modifying the aforementioned sixth exemplary embodiment so as to support a Flat Architecture and from applying, to Node B 500a, a method similar to that in the sixth exemplary embodiment applied to RNC 400, descriptions of operation thereof will be omitted.

In the present exemplary embodiment, BM-SC 100 can directly or indirectly instruct Nodes B 500-1~500-3 with respect to MBSFN information, and can thereby form wide-range MBSFN cluster 700 extending over Nodes B 500-1~500-3.

The present invention has been described with reference to the exemplary embodiments so far, but the present invention is not limited to the above described exemplary embodiments. The configuration and details of the present invention can be changed in various ways in a manner understandable to those skilled in the art without departing from the scope of the present invention.

For example, in the aforementioned first to eighth exemplary embodiments, BM-SC 100 instructs RNC 400 or Node B 500 with respect to parameters such as radio resources (frequency, scrambling code, channelisation code, slot format) and transmission timing as MBSFN information, but when the present invention is applied to an LTE network, other parameters may be instructed instead of these parameters or other parameters may be additionally instructed. When, for example, OFDMA (Orthogonal Frequency Division Multiple Access) is used on a downlink, radio resources can be indicated by one of the following three patterns. Since these patterns are not essential parts of the present invention, detailed descriptions thereof will be omitted.

(Pattern 1)
Subcarrier numbers and symbol numbers for allocating MBMS data are instructed.

(Pattern 2)
MBMS data allocation time and frequency are additionally instructed.

(Pattern 3)
Resource block numbers are instructed.

The method executed by BM-SC 100, RNC 400 and Node B 500 of the present invention may also be applied to a program to be executed by a computer. Furthermore, the program may also be stored in a storage medium and may also be delivered to the outside via a network.

The present application claims a priority based on Japanese Patent Application No. 2008-281441, filed on Oct. 31, 2008, the disclosure of which is incorporated herein by reference in its entirety.

The invention claimed is:

1. A mobile communication system comprising:
a mobile station;
a base station adapted to transmit Multimedia Broadcast Multicast Service (MBMS) data to the mobile station;
a core network node adapted to transmit, to the base station, an MBMS session start request message that includes a time to MBMS data transfer and a time of MBMS data transfer which denotes a time of a start of the MBMS data transfer, wherein the time to MBMS data transfer is different from the time of MBMS data transfer; and
wherein the base station receives the MBMS session start request message including the time to MBMS data transfer and the time of MBMS data transfer,
wherein a radio resource setup is performed according to the time of MBMS data transfer, and
wherein the MBMS session start request message further includes subcarrier numbers and symbol numbers for allocating MBMS data, MBMS data allocation time and frequency, and resource block numbers.

2. The mobile communication system according to claim 1, wherein the base station transmits the MBMS data to the mobile station according to the time to MBMS data transfer.

3. A base station in a mobile communication system comprising a mobile station and a core network node; the base station comprising:
a receiver adapted to receive, from the core network node, a Multimedia Broadcast Multicast Service (MBMS) session start request message that includes a time to MBMS data transfer and a time of MBMS data transfer which denotes a time of a start of the MBMS data transfer, wherein the time to MBMS data transfer is different from the time of MBMS data transfer,
wherein a radio resource setup is performed according to the time of MBMS data transfer, and wherein the MBMS session start request message further includes subcarrier numbers and symbol numbers for allocating MBMS data, MBMS data allocation time and frequency, and resource block numbers.

4. The base station according to claim 3, wherein the base station further comprises a transmitter adapted to transmit the MBMS data to a mobile station according to the time to MBMS data transfer.

5. A mobile station in a mobile communication system comprising a base station and a core network node, the mobile station comprising:
a receiver adapted to receive Multimedia Broadcast Multicast Service (MBMS) data from the base station, wherein the MBMS data is based on a time to MBMS data transfer and a time of MBMS data transfer which denotes a time of a start of the MBMS data transfer, wherein the time to MBMS data transfer is different from the time of MBMS data transfer, and
wherein an MBMS session start request message, including the time to MBMS data transfer and the time of MBMS data transfer, is transmitted from the core network node to the base station,
wherein a radio resource setup is performed according to the time of MBMS data transfer, and
wherein the MBMS session start request message further includes subcarrier numbers and symbol numbers for allocating MBMS data, MBMS data allocation time and frequency, and resource block numbers.

6. The mobile station according to claim 5, wherein the receiver is further configured to receive, from the base station, the MBMS data according to the time to MBMS data transfer.

7. A core network node in a mobile communication system comprising a mobile station and a base station; the core network node comprising:
a transmitter adapted to transmit, to the base station, a Multimedia Broadcast Multicast Service (MBMS) session start request message that includes a time to MBMS data transfer and a time of MBMS data transfer which denotes a time of a start of the MBMS data transfer, wherein the time to MBMS data transfer is different from the time of MBMS data transfer,
wherein a radio resource setup is performed according to the time of MBMS data transfer, and
wherein the MBMS session start request message further includes subcarrier numbers and symbol numbers for allocating MBMS data, MBMS data allocation time and frequency, and resource block numbers.

8. The core network node according to claim 7, wherein the base station transits the MBMS data to the mobile station according to the time to MBMS data transfer.

9. A method for a core network node in a mobile communication system comprising a mobile station and a base station, the method comprising:
including a time to Multimedia Broadcast Multicast Service (MBMS) data transfer into an MBMS session start request message; and
transmitting, to the base station, the MBMS session start request message that includes the time to MBMS data transfer and a time of MBMS data transfer which denotes a time of a start of the MBMS data transfer, wherein the time to MBMS data transfer is different from the time of MBMS data transfer,
wherein a radio resource setup is performed according to the time of MBMS data transfer, and
wherein the MBMS session start request message further includes subcarrier numbers and symbol numbers for allocating MBMS data, MBMS data allocation time and frequency, and resource block numbers.

10. The method according to claim 9, further comprising the base station transmitting the MBMS data to the mobile station according to the time to MBMS data transfer.

* * * * *